(12) United States Patent
Fridman et al.

(10) Patent No.: US 10,645,286 B2
(45) Date of Patent: May 5, 2020

(54) CAMERA WITH PANORAMIC SCANNING RANGE

(71) Applicant: Corephotonics Ltd., Tel Aviv (IL)

(72) Inventors: Roy Fridman, Tel Aviv (IL); Gil Bachar, Tel Aviv (IL); Ruthy Katz, Tel Aviv (IL); Itamar Zinger, Hod HaSharon (IL); Paz Ilan, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 16/300,576

(22) PCT Filed: Feb. 13, 2018

(86) PCT No.: PCT/IB2018/050885
§ 371 (c)(1),
(2) Date: Nov. 11, 2018

(87) PCT Pub. No.: WO2018/167581
PCT Pub. Date: Sep. 20, 2018

(65) Prior Publication Data
US 2019/0394396 A1    Dec. 26, 2019

Related U.S. Application Data

(60) Provisional application No. 62/560,684, filed on Sep. 20, 2017, provisional application No. 62/471,662, filed on Mar. 15, 2017.

(51) Int. Cl.
*H04N 7/00* (2011.01)
*H04N 5/232* (2006.01)
(Continued)

(52) U.S. Cl.
CPC ......... *H04N 5/23238* (2013.01); *G03B 17/17* (2013.01); *H04N 5/2254* (2013.01); *H04N 5/23296* (2013.01); *H04N 5/2628* (2013.01)

(58) Field of Classification Search
CPC ............. H04N 5/23238; H04N 5/2254; H04N 5/2628; H04N 5/23296; G03B 17/17
See application file for complete search history.

(56) References Cited

U.S. PATENT DOCUMENTS

| 4,199,785 A | 4/1980 | McCullough et al. |
| 5,005,083 A | 4/1991 | Grage et al. |
| (Continued) | | |

FOREIGN PATENT DOCUMENTS

| CN | 101276415 A | 10/2008 |
| CN | 102739949 A | 10/2012 |
| (Continued) | | |

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Richard T Torrente
(74) *Attorney, Agent, or Firm* — Nathan & Associates; Menachem Nathan

(57) ABSTRACT

Cameras with panoramic scanning range comprising a folded digital camera in which an optical path folding element (OPFE) that folds a first optical path from an object or scene into a second optical path substantially parallel with an optical axis of a lens of the folded camera, the OPFE being rotatable around the lens optical axis, and systems incorporating such cameras.

8 Claims, 12 Drawing Sheets

(51) Int. Cl.
*G03B 17/17* (2006.01)
*H04N 5/225* (2006.01)
*H04N 5/262* (2006.01)

(56) References Cited

U.S. PATENT DOCUMENTS

| | | | |
|---|---|---|---|
| 5,032,917 A | 7/1991 | Aschwanden | |
| 5,051,830 A | 9/1991 | von Hoessle | |
| 5,248,971 A | 9/1993 | Mandl | |
| 5,287,093 A | 2/1994 | Amano et al. | |
| 5,394,520 A | 2/1995 | Hall | |
| 5,436,660 A | 7/1995 | Sakamoto | |
| 5,444,478 A | 8/1995 | Lelong et al. | |
| 5,459,520 A | 10/1995 | Sasaki | |
| 5,657,402 A | 8/1997 | Bender et al. | |
| 5,682,198 A | 10/1997 | Katayama et al. | |
| 5,768,443 A | 6/1998 | Michael et al. | |
| 5,926,190 A | 7/1999 | Turkowski et al. | |
| 5,940,641 A | 8/1999 | McIntyre et al. | |
| 5,982,951 A | 11/1999 | Katayama et al. | |
| 6,101,334 A | 8/2000 | Fantone | |
| 6,128,416 A | 10/2000 | Oura | |
| 6,148,120 A | 11/2000 | Sussman | |
| 6,208,765 B1 | 3/2001 | Bergen | |
| 6,268,611 B1 | 7/2001 | Pettersson et al. | |
| 6,549,215 B2 | 4/2003 | Jouppi | |
| 6,611,289 B1 | 8/2003 | Yu et al. | |
| 6,643,416 B1 | 11/2003 | Daniels et al. | |
| 6,650,368 B1 | 11/2003 | Doron | |
| 6,680,748 B1 | 1/2004 | Monti | |
| 6,714,665 B1 | 3/2004 | Hanna et al. | |
| 6,724,421 B1 | 4/2004 | Glatt | |
| 6,738,073 B2 | 5/2004 | Park et al. | |
| 6,741,250 B1 | 5/2004 | Furlan et al. | |
| 6,750,903 B1 | 6/2004 | Miyatake et al. | |
| 6,778,207 B1 | 8/2004 | Lee et al. | |
| 7,002,583 B2 | 2/2006 | Rabb, III | |
| 7,015,954 B1 | 3/2006 | Foote et al. | |
| 7,038,716 B2 | 5/2006 | Klein et al. | |
| 7,199,348 B2 | 4/2007 | Olsen et al. | |
| 7,206,136 B2 | 4/2007 | Labaziewicz et al. | |
| 7,248,294 B2 | 7/2007 | Slatter | |
| 7,256,944 B2 | 8/2007 | Labaziewicz et al. | |
| 7,305,180 B2 | 12/2007 | Labaziewicz et al. | |
| 7,339,621 B2 | 3/2008 | Fortier | |
| 7,346,217 B1 | 3/2008 | Gold, Jr. | |
| 7,365,793 B2 | 4/2008 | Cheatle et al. | |
| 7,411,610 B2 | 8/2008 | Doyle | |
| 7,424,218 B2 | 9/2008 | Baudisch et al. | |
| 7,509,041 B2 | 3/2009 | Hosono | |
| 7,533,819 B2 | 5/2009 | Barkan et al. | |
| 7,619,683 B2 | 11/2009 | Davis | |
| 7,738,016 B2 | 6/2010 | Toyofuku | |
| 7,773,121 B1 | 8/2010 | Huntsberger et al. | |
| 7,809,256 B2 | 10/2010 | Kuroda et al. | |
| 7,880,776 B2 | 2/2011 | LeGall et al. | |
| 7,918,398 B2 | 4/2011 | Li et al. | |
| 7,964,835 B2 | 6/2011 | Olsen et al. | |
| 7,978,239 B2 | 7/2011 | Deever et al. | |
| 8,115,825 B2 | 2/2012 | Culbert et al. | |
| 8,149,327 B2 | 4/2012 | Lin et al. | |
| 8,154,610 B2 | 4/2012 | Jo et al. | |
| 8,238,695 B1 | 8/2012 | Davey et al. | |
| 8,274,552 B2 | 9/2012 | Dahi et al. | |
| 8,390,729 B2 | 3/2013 | Long et al. | |
| 8,391,697 B2 | 3/2013 | Cho et al. | |
| 8,400,555 B1 | 3/2013 | Georgiev et al. | |
| 8,439,265 B2 | 5/2013 | Ferren et al. | |
| 8,446,484 B2 | 5/2013 | Muukki et al. | |
| 8,483,452 B2 | 7/2013 | Ueda et al. | |
| 8,514,491 B2 | 8/2013 | Duparre | |
| 8,547,389 B2 | 10/2013 | Hoppe et al. | |
| 8,553,106 B2 | 10/2013 | Scarff | |
| 8,587,691 B2 | 11/2013 | Takane | |
| 8,619,148 B1 | 12/2013 | Watts et al. | |
| 8,803,990 B2 | 8/2014 | Smith | |
| 8,896,655 B2 | 11/2014 | Mauchly et al. | |
| 8,976,255 B2 | 3/2015 | Matsuoto et al. | |
| 9,019,387 B2 | 4/2015 | Nakano | |
| 9,025,073 B2 | 5/2015 | Attar et al. | |
| 9,025,077 B2 | 5/2015 | Attar et al. | |
| 9,041,835 B2 | 5/2015 | Honda | |
| 9,137,447 B2 | 9/2015 | Shibuno | |
| 9,185,291 B1 | 11/2015 | Shabtay et al. | |
| 9,215,377 B2 | 12/2015 | Sokeila et al. | |
| 9,215,385 B2 | 12/2015 | Luo | |
| 9,270,875 B2 | 2/2016 | Brisedoux et al. | |
| 9,286,680 B1 | 3/2016 | Jiang et al. | |
| 9,344,626 B2 | 5/2016 | Silverstein et al. | |
| 9,360,671 B1 | 6/2016 | Zhou | |
| 9,369,621 B2 | 6/2016 | Malone et al. | |
| 9,413,930 B2 | 8/2016 | Geerds | |
| 9,413,984 B2 | 8/2016 | Attar et al. | |
| 9,420,180 B2 | 8/2016 | Jin | |
| 9,438,792 B2 | 9/2016 | Nakada et al. | |
| 9,485,432 B1 | 11/2016 | Medasani et al. | |
| 9,578,257 B2 | 2/2017 | Attar et al. | |
| 9,618,748 B2 | 4/2017 | Munger et al. | |
| 9,681,057 B2 | 6/2017 | Attar et al. | |
| 9,723,220 B2 | 8/2017 | Sugie | |
| 9,736,365 B2 | 8/2017 | Laroia | |
| 9,736,391 B2 | 8/2017 | Du et al. | |
| 9,768,310 B2 | 9/2017 | Ahn et al. | |
| 9,800,798 B2 | 10/2017 | Ravirala et al. | |
| 9,851,803 B2 | 12/2017 | Fisher et al. | |
| 9,894,287 B2 | 2/2018 | Qian et al. | |
| 9,900,522 B2 | 2/2018 | Lu | |
| 9,927,600 B2 | 3/2018 | Goldenberg et al. | |
| 2002/0005902 A1 | 1/2002 | Yuen | |
| 2002/0030163 A1 | 3/2002 | Zhang | |
| 2002/0063711 A1 | 5/2002 | Park et al. | |
| 2002/0075258 A1 | 6/2002 | Park et al. | |
| 2002/0122113 A1 | 9/2002 | Foote | |
| 2002/0167741 A1 | 11/2002 | Koiwai et al. | |
| 2003/0030729 A1 | 2/2003 | Prentice et al. | |
| 2003/0093805 A1 | 5/2003 | Gin | |
| 2003/0160886 A1 | 8/2003 | Misawa et al. | |
| 2003/0202113 A1 | 10/2003 | Yoshikawa | |
| 2004/0008773 A1 | 1/2004 | Itokawa | |
| 2004/0012683 A1 | 1/2004 | Yamasaki et al. | |
| 2004/0017386 A1 | 1/2004 | Liu et al. | |
| 2004/0027367 A1 | 2/2004 | Pilu | |
| 2004/0061788 A1 | 4/2004 | Bateman | |
| 2004/0240052 A1 | 12/2004 | Minefuji et al. | |
| 2005/0013509 A1 | 1/2005 | Samadani | |
| 2005/0046740 A1 | 3/2005 | Davis | |
| 2005/0157184 A1 | 7/2005 | Nakanishi et al. | |
| 2005/0168834 A1 | 8/2005 | Matsumoto et al. | |
| 2005/0200718 A1 | 9/2005 | Lee | |
| 2006/0054782 A1 | 3/2006 | Olsen et al. | |
| 2006/0056056 A1 | 3/2006 | Ahiska et al. | |
| 2006/0125937 A1 | 6/2006 | LeGall et al. | |
| 2006/0170793 A1 | 8/2006 | Pasquarette et al. | |
| 2006/0175549 A1 | 8/2006 | Miller et al. | |
| 2006/0187310 A1 | 8/2006 | Janson et al. | |
| 2006/0187322 A1 | 8/2006 | Janson et al. | |
| 2006/0187338 A1 | 8/2006 | May et al. | |
| 2007/0024737 A1 | 2/2007 | Nakamura et al. | |
| 2007/0126911 A1* | 6/2007 | Nanjo | G02B 15/177 348/335 |
| 2007/0177025 A1 | 8/2007 | Kopet et al. | |
| 2007/0188653 A1 | 8/2007 | Pollock et al. | |
| 2007/0189386 A1 | 8/2007 | Imagawa et al. | |
| 2007/0257184 A1 | 11/2007 | Olsen et al. | |
| 2007/0285550 A1 | 12/2007 | Son | |
| 2008/0017557 A1 | 1/2008 | Witdouck | |
| 2008/0024614 A1 | 1/2008 | Li et al. | |
| 2008/0025634 A1 | 1/2008 | Border et al. | |
| 2008/0030592 A1 | 2/2008 | Border et al. | |
| 2008/0030611 A1 | 2/2008 | Jenkins | |
| 2008/0084484 A1 | 4/2008 | Ochi et al. | |
| 2008/0117316 A1 | 5/2008 | Orimoto | |
| 2008/0218611 A1 | 9/2008 | Parulski et al. | |
| 2008/0218612 A1 | 9/2008 | Border et al. | |

(56) References Cited

U.S. PATENT DOCUMENTS

| | | |
|---|---|---|
| 2008/0218613 A1 | 9/2008 | Janson et al. |
| 2008/0219654 A1 | 9/2008 | Border et al. |
| 2009/0086074 A1 | 4/2009 | Li et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0238327 A1 | 9/2010 | Griffith et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2012/0026366 A1 | 2/2012 | Golan et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0093842 A1 | 4/2013 | Yahata |
| 2013/0135445 A1 | 5/2013 | Dahl et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0092066 A1 | 4/2015 | Geiss et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0271471 A1 | 9/2015 | Hsieh et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0214846 A1 | 7/2017 | Du et al. |
| 2017/0214866 A1 | 7/2017 | Zhu et al. |
| 2017/0242225 A1* | 8/2017 | Fiske ............... G02B 13/001 |
| 2017/0264829 A1* | 9/2017 | Zhou ............... H04N 5/23296 |
| 2017/0289458 A1 | 10/2017 | Song et al. |
| 2018/0024329 A1 | 1/2018 | Goldenberg et al. |
| 2018/0120674 A1 | 5/2018 | Avivi et al. |
| 2018/0150973 A1 | 5/2018 | Tang et al. |
| 2018/0241922 A1 | 8/2018 | Baldwin |
| 2018/0295292 A1 | 10/2018 | Lee et al. |

FOREIGN PATENT DOCUMENTS

| | | |
|---|---|---|
| CN | 103024272 A | 4/2013 |
| CN | 103841404 A | 6/2014 |
| EP | 1536633 A1 | 6/2005 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2003298920 A | 10/2003 |
| JP | 2004133054 A | 4/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2013106289 A | 5/2013 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20150118012 A | 10/2015 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7 μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

(56) References Cited

OTHER PUBLICATIONS

Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.

* cited by examiner

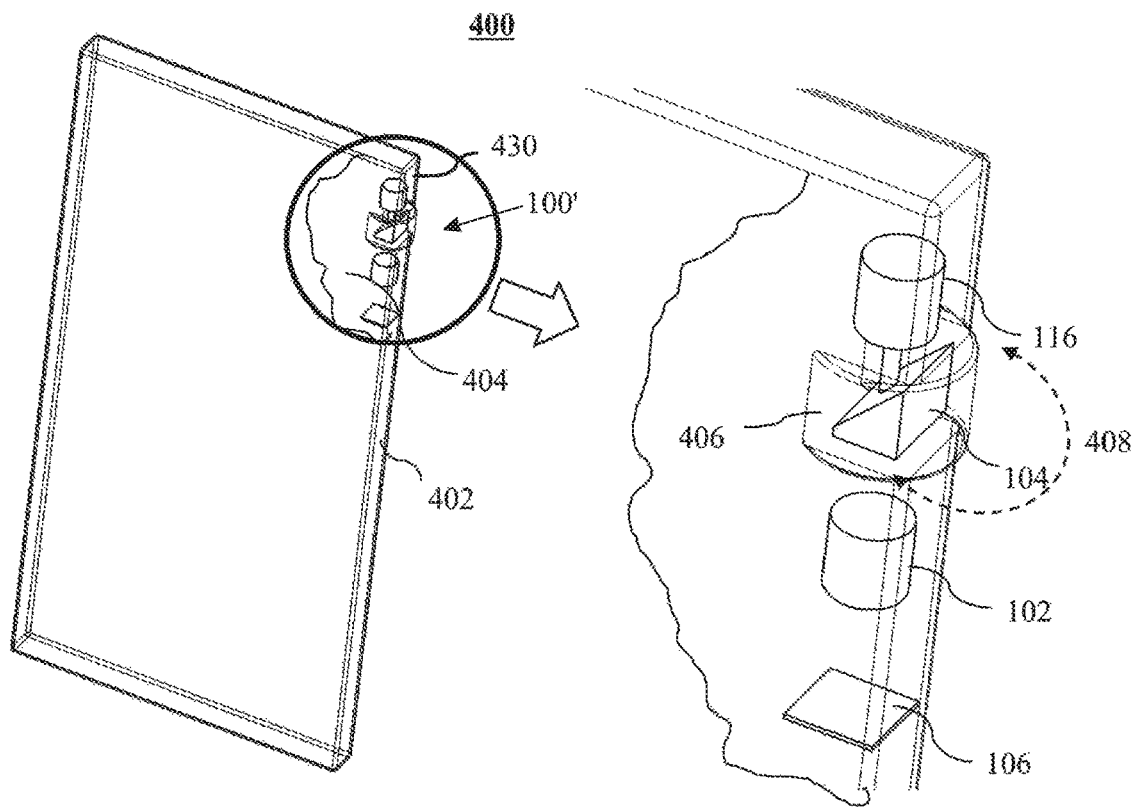
FIG. 4A
FIG. 4B
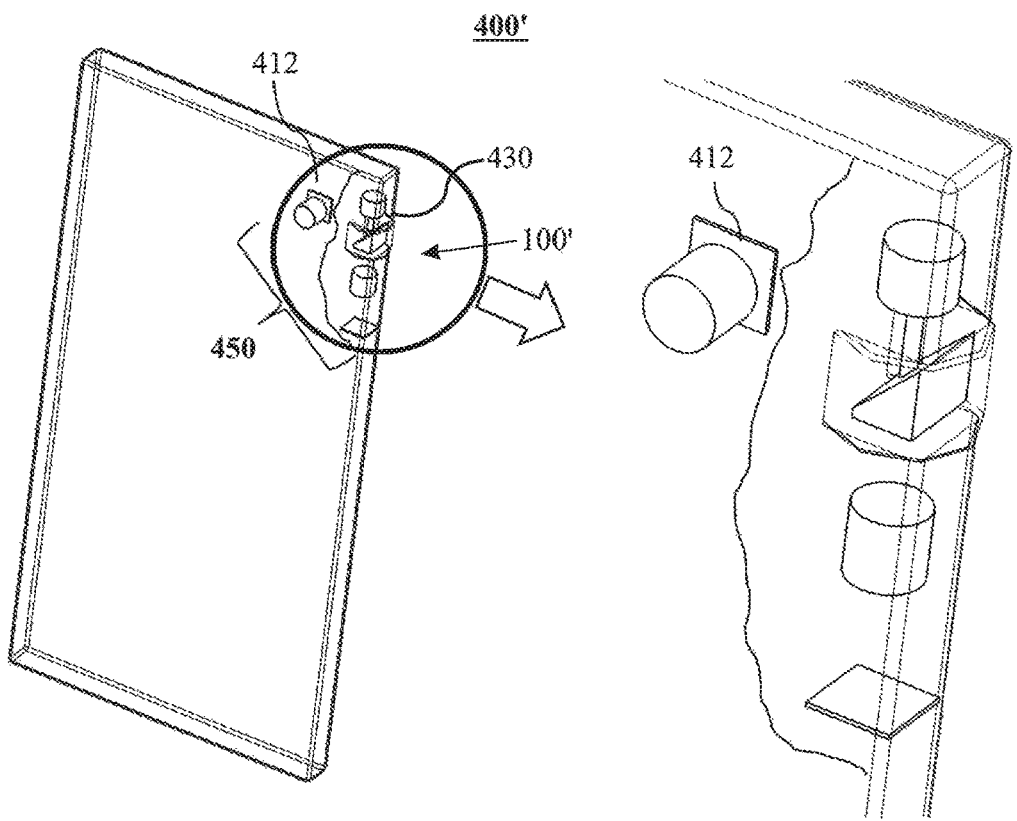
FIG. 4C
FIG. 4D

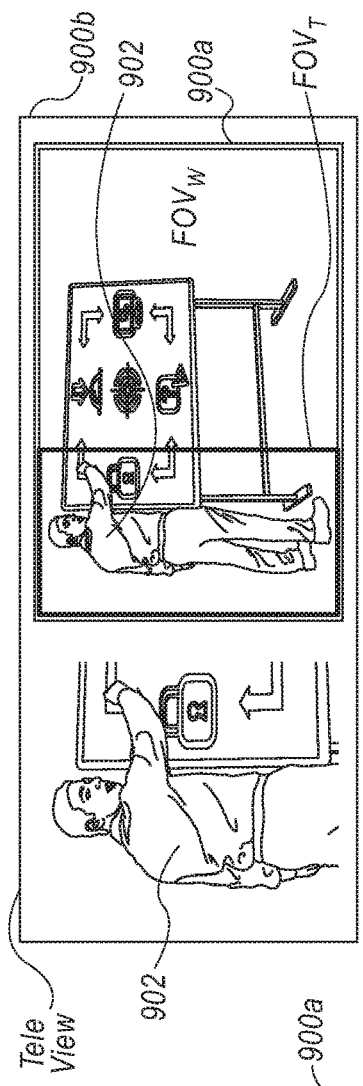
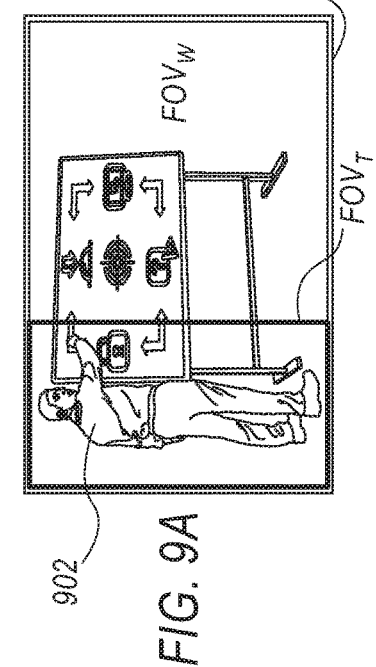
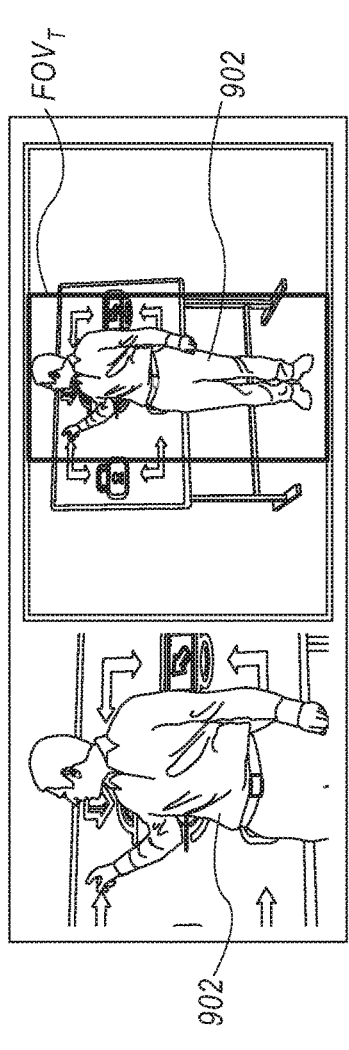
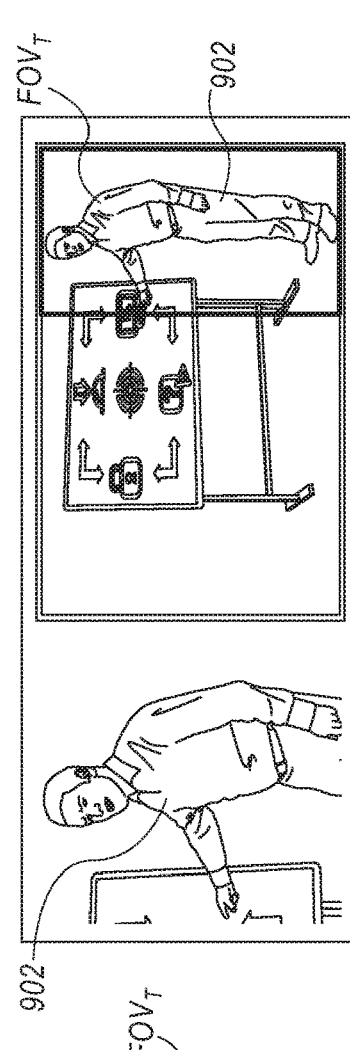
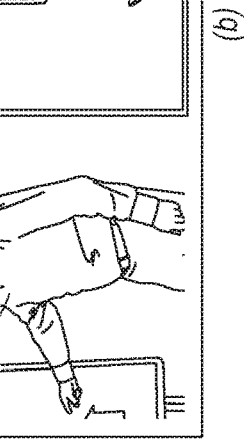
FIG. 9A
FIG. 9B
FIG. 9C

CAMERA WITH PANORAMIC SCANNING RANGE

CROSS REFERENCE TO RELATED APPLICATIONS

This application is a 371 application from international application PCT/IB2018/050885, and claims the benefit of U.S. Provisional patent applications No. 62/471,662 filed Mar. 15, 2017 and 62/560,684 filed Sep. 20, 2017, both of which are incorporated herein by reference in their entirety.

FIELD

Embodiments disclosed herein relate in general to cameras and in particular to cameras based on digital cameras with folded optics.

BACKGROUND

Compact digital cameras having folded optics, also referred to as "folded cameras" or "folded camera modules", are known, see e.g. Applicant's co-owned international patent application PCT/IB2016/052179. Such folded cameras include a lens, an optical path folding element (OPFE)—normally a prism or mirror—and an image sensor. The OPFE folds a first optical path along a first axis from an object or scene to the OPFE, into a second optical path along a second axis substantially orthogonal to the first axis, the second axis being also an optical axis of the lens and of the folded camera. Some OPFEs are designed to tilt or rotate around the first axis or around a third axis orthogonal to both the first and second axes. There is no known folded camera in which the OPFE is known to rotate around the optical axis of the lens. There are also no known cameras based on folded digital cameras that are capable of 180 degrees or more panoramic scanning.

SUMMARY

In various exemplary embodiments there are provided cameras based on folded digital cameras having a panoramic scanning range. In some embodiments, one or more cameras with panoramic scanning range as described in more detail below may be incorporated in a platform. As used herein, the term "platform" refers to an article of manufacture (also referred to as "system"). The platform may be a mobile device such as a smartphone or a tablet computer (or simply "tablet"), a flying drone, a television (TV) set or display, a personal electronic device (PED), a vehicular system (vehicle), etc. Each of the cameras with panoramic scanning range may provide panoramic views with up to 180 degrees or even up to 360 degrees. When incorporated in a smartphone or tablet, a folded camera with panoramic scanning range may be positioned at an edge of the smartphone or tablet and can be used as either a front camera or as a back camera of the smartphone or tablet.

In some embodiments, a camera with panoramic scanning range as above may be incorporated together with a non-folded camera in a dual-aperture (dual-camera) arrangement. The dual-aperture arrangement may be included in a mobile device such as a smartphone or a tablet, a flying drone, a television set, other PEDs and/or other devices/systems such as vehicular systems.

In exemplary embodiments, there are provided cameras comprising a folded digital camera that includes an image sensor having an image sensor area, a lens having a lens optical axis, and an OPFE that folds a first optical path from an object or scene to a second optical path, the second optical path being substantially parallel with the lens optical axis, the OPFE being rotatable around the lens optical axis relative to the image sensor. In some embodiments, the OPFE may be a prism. In other embodiments, the OPFE may be a mirror.

In an exemplary embodiment, the OPFE is rotatable in an angle of up to 180 degrees.

In an exemplary embodiment, the OPFE is rotatable in an angle of up to 360 degrees.

In an exemplary embodiment, the rotation of the OPFE around the lens optical axis provides a plurality of different images.

In an exemplary embodiment, the plurality of different images represents at least a section of a panoramic view.

In an exemplary embodiment, the lens has a lens image circle bound by the image sensor area.

In an exemplary embodiment, the OPFE has a plurality of positions and the camera has a field of view (FOV) bound by the lens image circle for each OPFE position.

In an exemplary embodiment, a camera is operative to record a video stream with a changing or adaptive field of view.

In some exemplary embodiments, a camera further comprises an actuator for rotating the OPFE around the lens optical axis. The actuator may be a step motor or a voice coil motor.

In some exemplary embodiments, the lens is a folded lens.

In some exemplary embodiments, the lens is fixedly attached to the OPFE and is rotatable together with the OPFE around the lens optical axis relative to the image sensor.

In some exemplary embodiments, the folded lens is fixedly attached to the OPFE and is rotatable together with the OPFE around the lens optical axis relative to the image sensor.

In exemplary embodiments there are provided platforms, comprising: a first folded digital camera with a first field of view (FOV), the first folded digital camera including a first lens having a first lens optical axis, a first image sensor and a first OPFE that folds a first optical path from an object or scene to a second optical path, the second optical path being substantially parallel with the lens optical axis, the first OPFE being rotatable around the first lens optical axis relative to the first image sensor.

In some exemplary embodiments, a platform further comprises a second folded digital camera with a second FOV larger than the first FOV. In some exemplary embodiments, the first folded digital camera is operational to change the first FOV autonomously.

In some exemplary embodiments, a platform further comprises a second folded digital camera that includes a second lens having a second lens optical axis and a second OPFE that folds the first optical path from an object or scene to the second optical path, the second OPFE being rotatable around the second lens optical axis. In an exemplary embodiment of such a platform, the first and second lens optical axes are parallel.

In some exemplary embodiments, the platform is a mobile device. In some such embodiments, the first folded digital camera is positioned on a side close to a mobile device edge and the first folded camera is operative to acquire a panoramic view of approximately 180 degrees. In some such embodiments, the first folded camera is operable as a front camera of the mobile device. In some such embodiments, the first folded camera is operable as a back camera of the mobile device. In some exemplary embodiments, the mobile device is a smartphone or a tablet.

In some exemplary embodiments, the platform is a mobile device, the first and second folded digital cameras are positioned on opposite sides close to respective mobile device edges, and each of the first and second folded cameras is operative to acquire a panoramic view of approximately 180 degrees. In some such embodiments, each of the first and second folded cameras is operable as a front camera or a back camera of the mobile device. In some such embodiments, each of the first and second folded cameras is operable as a back camera of the mobile device.

In some exemplary embodiments, the lens is fixedly attached to the OPFE and is rotatable together with the OPFE around the lens optical axis relative to the image sensor. In some exemplary embodiments, the lens is a folded lens.

In some exemplary embodiments, the platform is a flying drone. In some flying drone embodiments, at least one OPFE is operational to rotate at least 180 degrees.

In some exemplary embodiments, the platform is a television set.

In some exemplary embodiments, the platform is a personal electronic device.

In some exemplary embodiments, the platform is a vehicular system.

In some exemplary embodiments, there are provided methods comprising: providing a folded digital camera that includes an image sensor, a lens having a lens optical axis, and an OPFE that folds a first optical path from an object or scene to a second optical path, the second optical path being substantially parallel with the lens optical axis, the camera having an original orientation; rotating the OPFE around the lens optical axis relative to the image sensor in a first rotation direction to set the first optical path in a desired first direction; and taking an image.

In an exemplary method embodiment, a method further comprises digitally rotating the taken image back to the original orientation.

In some exemplary method embodiments, the rotating the OPFE around the lens optical axis in a first rotation direction to set the first optical path in a desired first direction includes rotating the OPFE to set the first optical path in a plurality of desired first directions in a first range of up to 180 degrees, and the taking an image includes taking an image at each direction of the plurality of desired first directions, thereby obtaining a matching first plurality of taken images. In one such method embodiment, the method further comprises constructing a first panoramic image from the first plurality of taken images.

In some exemplary method embodiments, a method further comprises rotating the OPFE around the lens optical axis in a second rotation direction opposite to the first rotation direction, to set the first optical path in a plurality of desired second directions in a second range of up to 180 degrees opposite to the first range, and the taking an image includes taking an image at each direction of the plurality of desired second directions, thereby obtaining a matching second plurality of taken images. In some such method embodiments, the method further comprises constructing a second panoramic image from the first plurality of taken images. In one such method embodiment, the method further comprises combining the first and second panoramic images into a combined panoramic image.

In some method embodiments, the lens is fixedly attached to the OPFE and the rotating the OPFE around the lens optical axis relative to the image sensor in a first rotation direction to set the first optical path in a desired first direction includes rotating the lens together with the OPFE.

In some method embodiments, the lens is a folded lens.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way.

FIG. 4A shows in an isometric view an exemplary embodiment of a smartphone that includes a camera with panoramic scanning range, according to presently disclosed subject matter;

FIG. 4B shows an enlarged cutout of a section of the smartphone in FIG. 4A;

FIG. 4C shows in an isometric back view an exemplary embodiment of a smartphone that includes a dual-aperture camera having an upright camera and a camera with a folded camera with panoramic scanning range, according to presently disclosed subject matter;

FIG. 4D shows an enlarged cutout of a section of the smartphone in FIG. 4C;

FIG. 9A shows in (a) a screen as seen by a first user and in (b) a screen as seen by a second user of $FOV_T$ and $FOV_W$ in a dual-camera arrangement included in a TV during autonomous $FOV_T$ tracking, with a first $FOV_T$ position on $FOV_W$;

FIG. 9B shows the same screens as in FIG. 9A, but with $FOV_T$ in a second position on $FOV_W$;

FIG. 9C shows the same screens as in FIG. 9A, but with $FOV_T$ in a third position on $FOV_W$.

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), an application specific integrated circuit (ASIC), etc.) capable of executing various data processing operations.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

In the text below, "digital rotation" is used to describe an image rotation by software, to distinguish from just "rotation" used to describe physical rotation of an optical element.

Figure 1A:
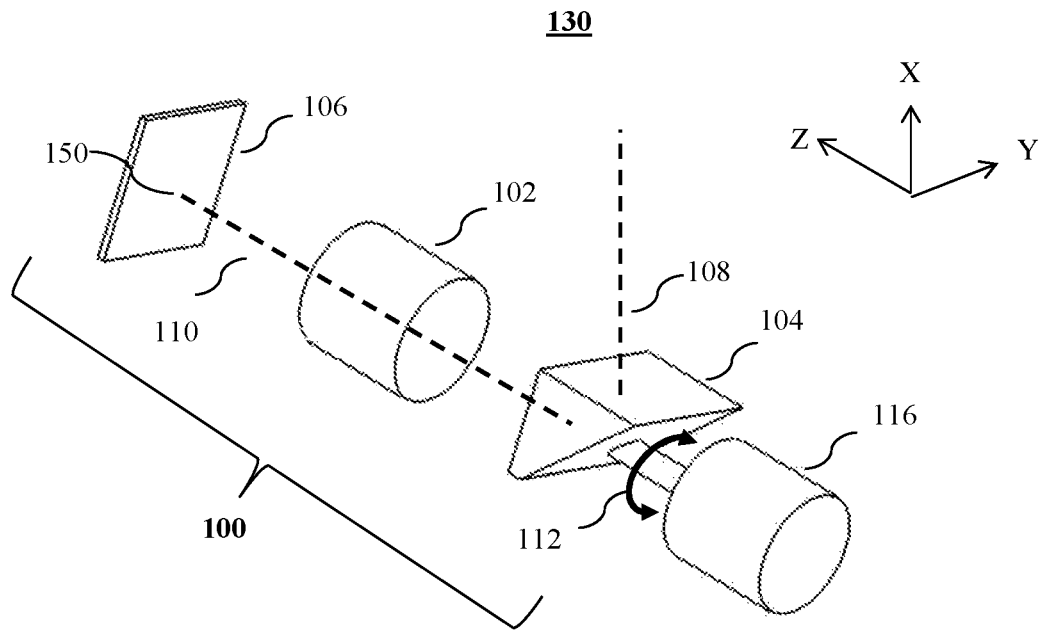
FIG. 1A shows schematically an exemplary embodiment of a camera with panoramic scanning range that includes a folded camera in an isometric view, according to presently disclosed subject matter.

FIG. 1A shows schematically an exemplary embodiment of a folded camera (also referred to as "folded camera module") numbered 100 in an isometric view. An orthogonal X-Y-Z coordinate ("axis") system shown applies also to all following drawings. This coordinate system is exemplary. Camera 100 includes a lens assembly (or simply "lens") 102, an optical path folding element (OPFE) 104 and an image sensor 106. OPFE 104 folds a first optical path along an axis 108 substantially parallel to the X axis (in the exemplary coordinate system), the first optical path being from an object, scene or panoramic view section 114 to the OPFE, into a second optical path along an axis 110 substantially parallel to the Z axis (in the exemplary coordinate system). Axis 110 is the optical axis of lens 102. Image sensor 106 has a plane normal aligned with (parallel to) axis 110. That is, image sensor 106 lies in a plane objects that lie generally in planes substantially orthogonal to the first optical path. Image sensor 106 outputs an output image. The output image may be processed by an image signal processor (ISP—not shown) for demosaicing, white balance, lens shading correction, bad pixel correction, and other processes known in the art of ISP design. In some embodiments, the ISP may be part of image sensor 106. Optical axis 110 may also be referred to herein as "folded camera optical axis".

In some embodiments, camera 100 may further include a focus or autofocus (AF) mechanism (not shown), allowing to move (or "shift" or "actuate") lens 102 along axis 110, such that is can focus images from objects at various distances on image sensor 106. For simplicity, the description continues with reference only to AF, with the understanding that it also covers regular (manual) focus. The AF actuation mechanism is typically of a voice coil motor (VCM) type, i.e. a "VCM actuator". Such actuation mechanisms are known in the art and disclosed for example in Applicant's co-owned international patent applications PCT/IB2015/056004 and PCT/IB2016/055308. This is however a non-limiting example, and the AF mechanism may be of other types, such as a stepper motor, a shape memory alloy (SMA) actuator, or other types known in the art. In some embodiments, camera 100 may include an optical image stabilization (OIS) actuation mechanism (not shown) in addition to, or instead of, the AF actuation mechanism. OIS may be achieved for example by shifting the lens in two directions in the X-Y plane, compensating for tilt of camera 100 around Z and X directions. A three degrees of freedom (DOF) OIS+focus actuation mechanism (which performs two movements for OIS and one for AF) is typically of VCM type and known in the art, for example as disclosed in international patent application PCT/US2013/076753 and in US patent application 2014/0327965. More information on auto-focus and OIS in a compact folded camera may be found in Applicant's co-owned international patent applications PCT/IB2016/052143, PCT/IB2016/052179 and PCT/IB2016/053335.

Figure 1B:
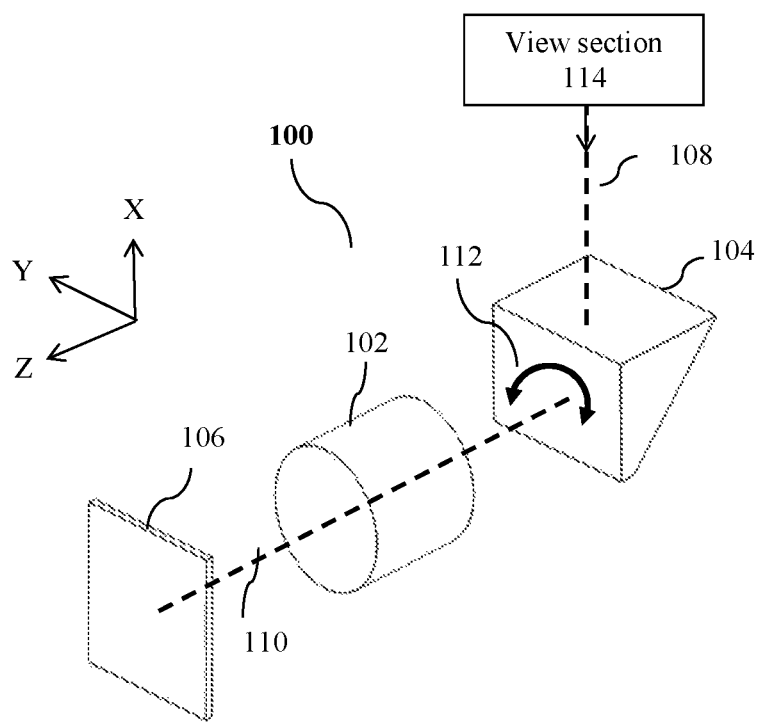
FIG. 1B shows the folded camera of FIG. 1A in a "zero" prism position.
Figure 1C:
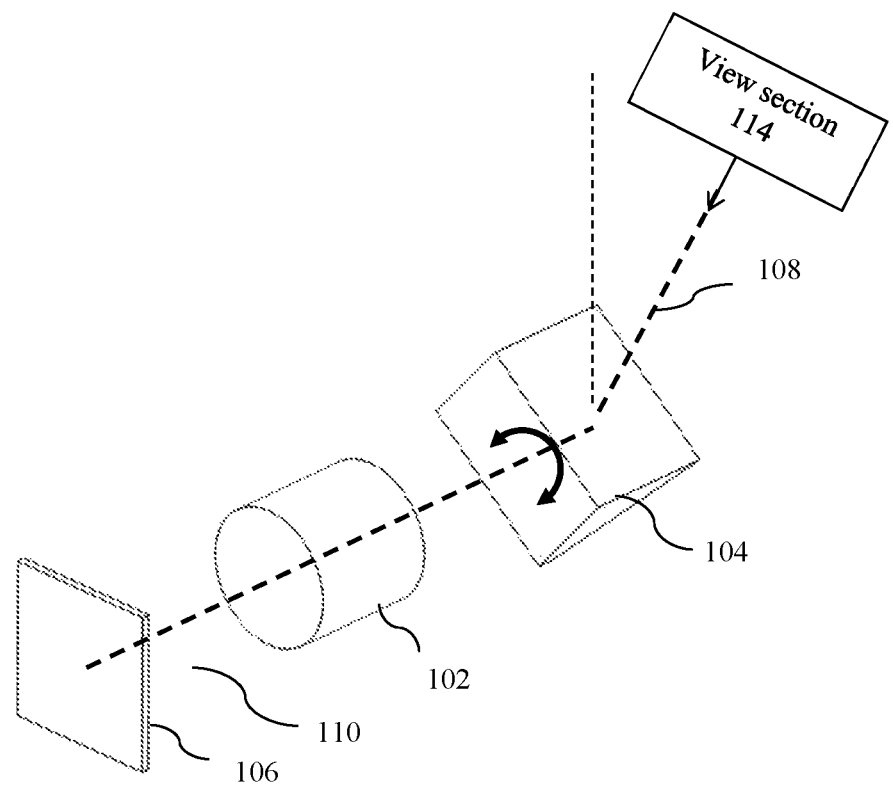
FIG. 1C shows the folded camera of FIG. 1A with its prism rotated around the folded camera optical axis by 30 degrees from the zero position.
Figure 1D:
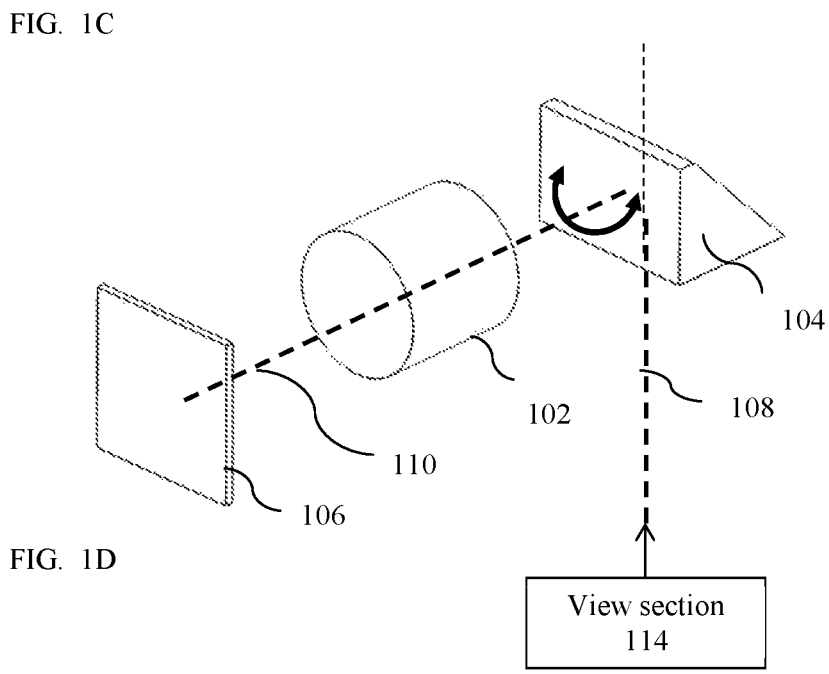
FIG. 1D shows the folded camera of FIG. 1A with its prism rotated around the folded camera optical axis by 180 degrees from the zero position.

In contrast with known folded camera modules (see e.g. PCT/IB2016/052179) camera 100 is designed to rotate OPFE 104 around axis 110 (the Z axis) relative to the image sensor, i.e. in the X-Y plane in the coordinate system shown, a rotation indicated by an arrow 112. OPFE 104 can rotate in an angle range as required by optical requirements (see below), in some cases by up to 180 degrees and in other cases by up to 360 degrees. FIG. 1C shows OPFE 104 after rotation by 30 degrees and FIG. 1D shows OPFE 104 after rotation by 180 degrees from an original "zero rotation" position (shown in FIG. 1B). The 30 degree and 180 degree rotated positions are exemplary of a range of many rotation positions. The rotation of OPFE around axis 110 may be driven, for example, by a stepper motor or by a VCM actuator 116. A stepper motor that may be used for rotating an OPFE as disclosed herein is for example stepper motor model FDM0620 manufactured by Dr. Fritz Faulhaber Gmbh and Co. Together, camera 100 and actuator 116 form a camera 130 with panoramic scanning range (FIG. 1A). An example of rotational VCM motor is provided for an example in co-owned international patent applications PCT/IB2017/052383 and PCT/IB2017/057706.

Figure 1E:
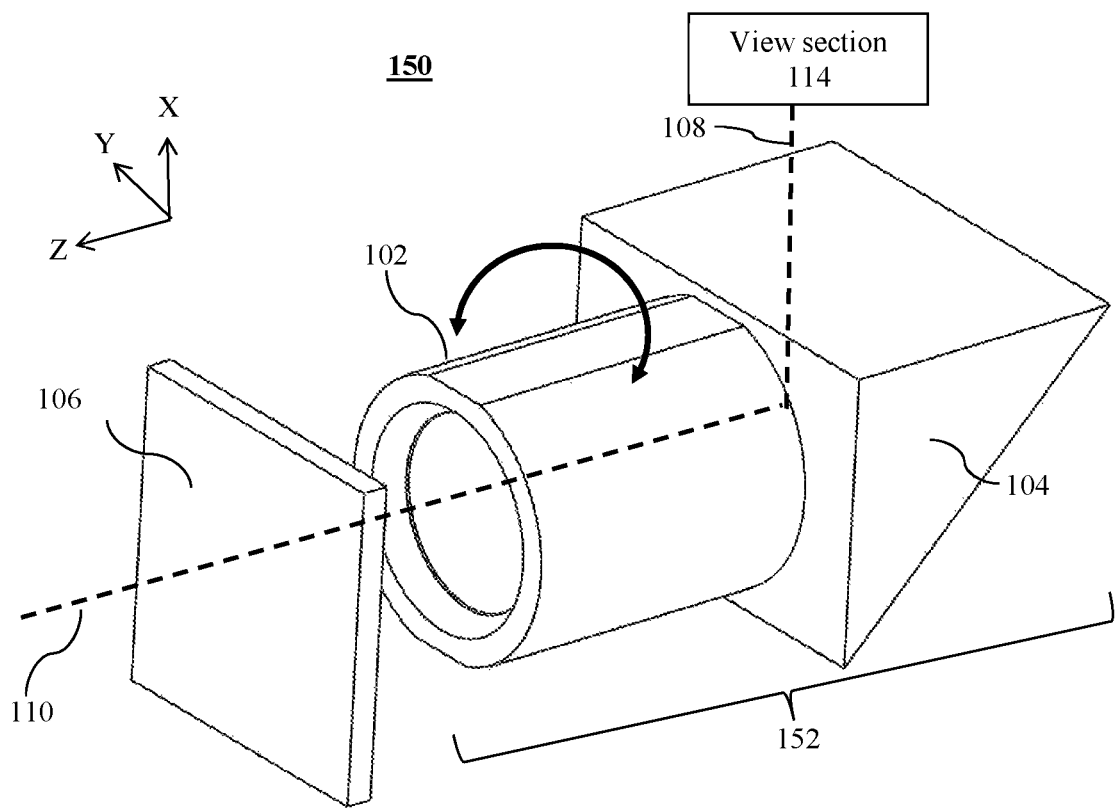
FIG. 1E shows schematically another exemplary embodiment of a camera with panoramic scanning range that includes a folded camera in which the lens is fixedly attached to a prism, according to presently disclosed subject matter.
Figure 1F:
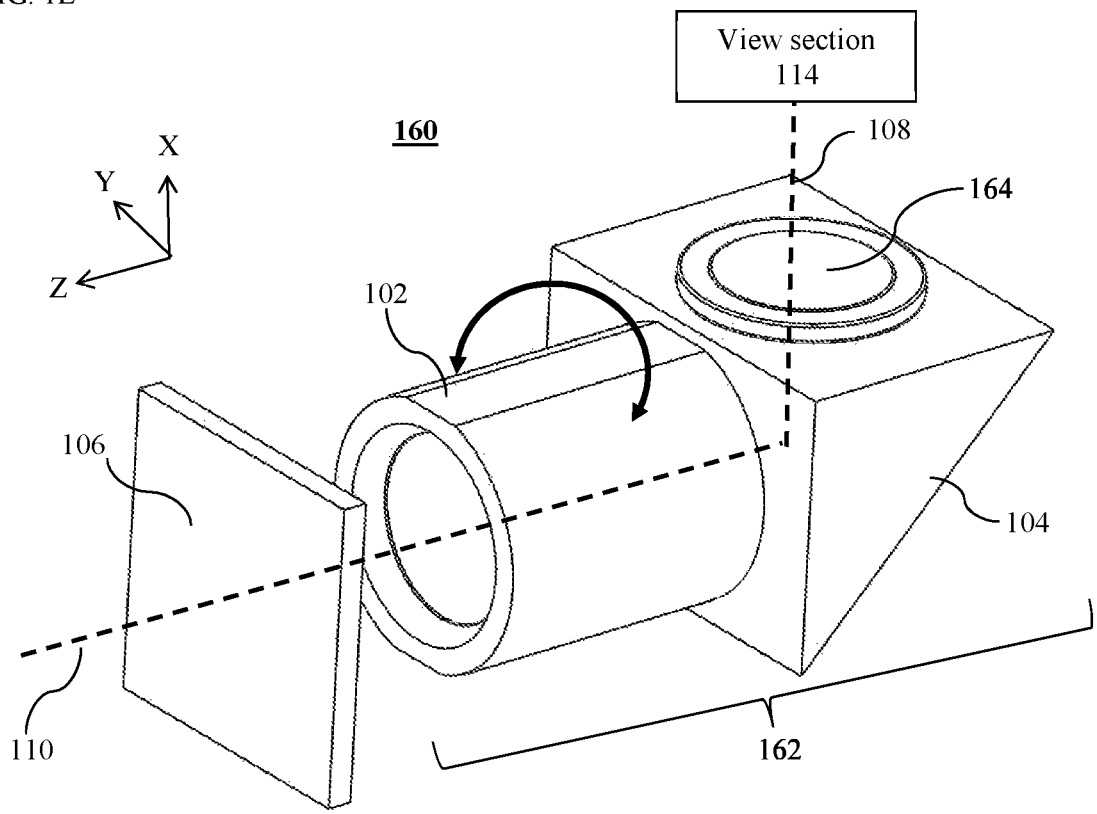
FIG. 1F shows schematically yet another exemplary embodiment of a camera with panoramic scanning range that includes a folded camera with a folded lens, according to presently disclosed subject matter.

In some embodiments, lens 102 may be optically axisymmetric. Therefore, any rotation of lens 102 around axis 102 does not change any optical property of the system and in particular the image. In such embodiments, lens 102 may rotate together with OPFE 104. In particular, as shown in an exemplary embodiment in FIG. 1E, in a camera 150, lens 102 may be fixedly attached (e.g. glued) to OPFE 104 to form a lens-OPFE assembly 152. In some embodiments as shown in an exemplary embodiment in FIG. 1F, in a camera 160, the lens and the OPFE may be combined to form a "folded lens" 162 (see e.g. the Asus ZenFone Zoom), in which some lens elements (such as, for example, a single lens element 164 shown in FIG. 1F) are positioned before the OPFE in the optical path from an imaged object, along axis 108, while other lens elements are positioned after the OPFE in the optical path toward the image sensor (i.e. as elements of lens assembly 102). In such embodiments, the entire lens-OPFE assembly (FIG. 1E) and/or folded lens (FIG. 1F) will rotate relative to the image sensor. In all the description below and above, cameras 150 and/or 160 may replace camera 100 in applications and/or analysis and/or methods of operation.

The rotation of OPFE 104 around axis 110 relative to the image sensor by "α" degrees will cause axis 108 (which, in its original state before rotation, is positioned perpendicular to the X axis in the coordinate system shown) to rotate in the X-Y plane and will result in two changes in the image on the image sensor: a) rotation of the center field-of-view (FOV) by α degrees and b) rotation of the image on image sensor (known in the art as "Roll" effect) by α degrees.

The rotation of the OPFE as described above and the consequent rotation of the first optical path allows photography of a panoramic view. Camera 100 has a panoramic scanning range. The panoramic view (and the scanning range) may be of up to 360 degrees. A plurality of photographs also referred to below as "sub-views", "image sections" or "view sections", each sub-view reflecting or related to a particular OPFE rotation positions, may be acquired and "stitched" into a "panoramic output image".

An "image circle" of lens 102 (see also FIGS. 2A and 2B) is defined as a circle on the sensor plane of the image sensor in which a sufficient amount of light arrives relative to the amount of light arriving at the sensor plane at a point 150 (the point where axis 110 meets the image sensor plane). Only sensor pixels within the image circle can be used for the output image. Sensor pixels outside of the image circle do not receive enough light from the object/scene photographed and are too noisy for a quality image. The image circle may be larger or smaller than the image sensor.

Figure 2A:
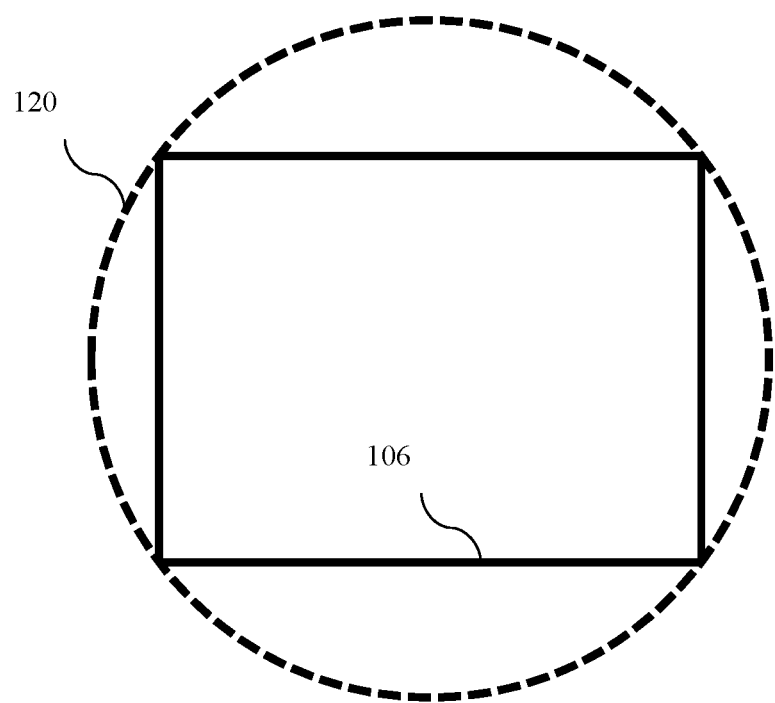
FIG. 2A illustrates schematically a rectangular image sensor smaller than, and bounded by an image circle.
Figure 2B:
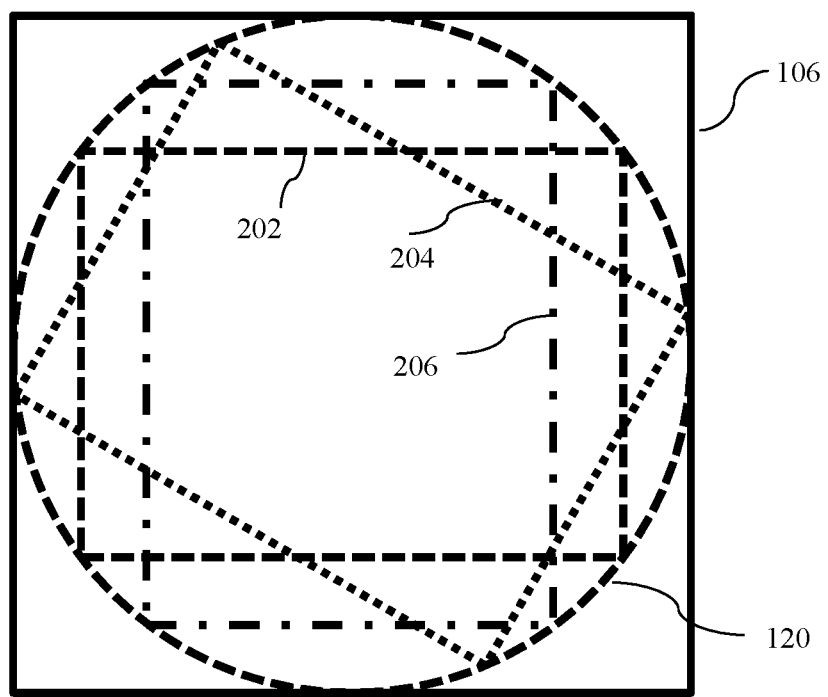
FIG. 2B illustrates schematically a square image sensor larger than, and bounding an image circle.

FIG. 2A shows one embodiment, in which (for example) a rectangular (with 3:4 edges length ratio) image sensor 106 is smaller than an image circle 120, the image circle thus "bounding" the image sensor. Here, an edge of the rectangle is smaller than the diameter of the image circle, and all the sensor pixels are inside the image circle. FIG. 2B shows another embodiment, in which (for example) a square image sensor 106 is larger than an image circle 120, the image sensor thus "bounding" the image circle. Here, an edge of the square is larger than the diameter of the image circle. Images obtained on an image sensor are typically of rectangular shape, typically with a 3:4 or 9:16 ratio between long edge and short edge dimensions. In camera 100, image sensor 106 is larger than image circle 120, i.e. as in FIG. 2B. The minimal dimensions of image sensor 106 in FIG. 2B are exemplary of minimal required sensor dimensions. Therefore, in camera 100, the largest possible image is any bound rectangle with edges that lie on image circle 120. This rectangle can be rotated by a certain degree relative to the edges of image sensor 106 under different actions, as explained below.

FIG. 2B also shows three examples of rectangular (with 3:4 edges length ratio) output image orientations taken from sensor 106: an image 202 in a "landscape" orientation (the longer rectangle edge is horizontal), an image 204 rotated by 30 degrees vs. the landscape orientation and an image 206 in a "portrait" orientation (the longer rectangle edge is vertical). Camera 100 may be used to output any single frame in a portrait or landscape orientation. Selection of orientation may be done digitally using an attached processing unit (not shown).

Figure 3A:
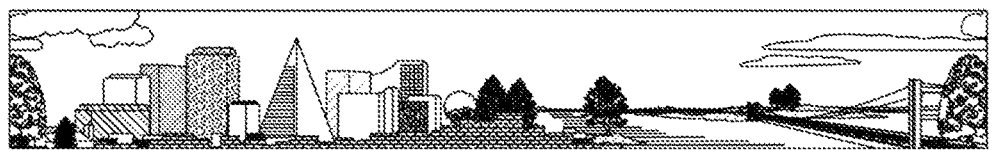
FIG. 3A illustrates the use of a camera with panoramic scanning range to scan and acquire a panoramic view, according to presently disclosed subject matter.
Figure 3B:
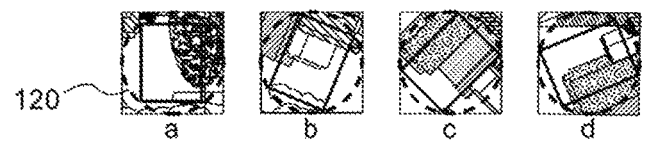
FIG. 3B shows 16 separate image sections of the panoramic view of FIG. 3A, each image section having a respective image circle and a respective cropped region defined by a 9:16 rectangle.
Figure 3B:
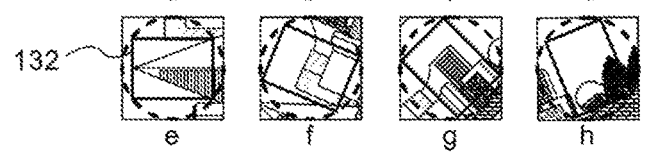
Figure 3C:
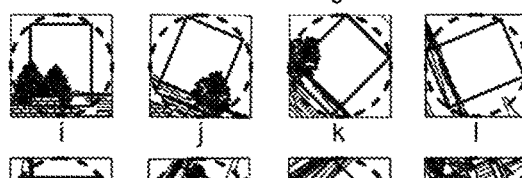
FIG. 3C shows the image sections of FIG. 3B stitched into a panoramic image.
Figure 3C:
Figure 3C:
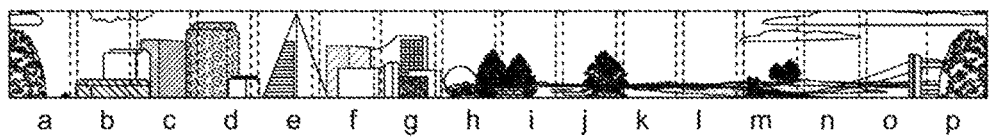

FIGS. 3A, 3B and 3C illustrate an embodiment of a method of use (usage) of camera 100 to scan and acquire a panoramic view. FIG. 3A shows a panoramic view with a 360 degrees (horizontal axis) by 56 degrees (vertical axis) field of view (FOV). The panoramic view is shown in a flattened image, with the understanding that the flattened image represents a circular view of 360 degrees. FIG. 3B shows 16 separate view sections (sub-views) "a" to "o" of the panoramic view, captured on image sensor 106 when OPFE 104 is rotated from 0 to 360 degrees with a jump size of 22.5 degrees between sub-views along the horizontal axis. In other cases, other jump sizes may be used between sub-views. FIG. 3B further shows, for each sub-view, a respective image circle 120 and a respective cropping region 132 defined by a 9:16 rectangle. For simplicity, image circle 120 is marked only on sub-view "a" and a cropping region 132 is marked only on sub-view "e". A cropping region provides a cropped image. The cropped image may be digitally rotated to the original orientation (sub-view "i"). Camera 100 may output any of sub-views "a" to "o" (or any sub-view at any rotation degree) as a single frame after appropriate rotation. FIG. 3C shows the reconstruction ("stitching") of the sub-view cropped images of FIG. 3B into a panoramic image. In general, the stitching of two adjacent images, each of which has a given FOV, requires the following actions: (a) detecting tilt, rotation, shift and other deviations between the two images; (b) digitally transforming at least one image into a corrected image to correct the deviations; and (c) digitally combining two adjacent corrected images into a single image with a continuous FOV larger than the two original given FOVs. Digital rotation and stitching actions may be done using software, as known in the art. The software may run on a processing unit (not shown), which may be part of the chipset of a device or system carrying camera 130 with camera 100, or which may operate camera 100 remotely. Note that any two adjacent images overlap over a small area, for example 10%-30% of the FOV of a single image. The overlap area is necessary for the actions in (a) and (c). In other cases, camera 100 may be used to scan a panoramic view with different FOV, for example less than 360 degrees in the horizontal axis, and/or for example more or less than 56 degrees in the vertical axis.

In another embodiment, camera 100 may be used to take a video, or a preview of a video on an operating device screen (see below operating devices examples). The scanning capability allows selection of the video field of view. An example below (in FIGS. 8-9) shows a video recording and stream with scanning FOV capability. Upon rotation of OPFE 104, the FOV of the camera changes and a rotated image is obtained on sensor 106. Camera 100 and an attached processing unit (not shown) may digitally anti-rotate the frames and video stream to show video aligned with original orientation (as presented in FIGS. 3 and 9). The final output may show a video movie with a scanning range of up to 360 degrees.

Several non-limiting examples (for example a smartphone and a flying drone) of platforms carrying or including a system such as camera 120 with camera 100 are presented in FIGS. 4-7.

FIG. 4A shows in an isometric view and FIG. 4B shows an enlarged cutout section of an exemplary embodiment, wherein the platform is a mobile device such as a smartphone numbered 400. Smartphone 400 includes a camera 430 with panoramic scanning range comprising a folded camera 100' like camera 100 and a stepper motor or VCM like actuator 116. Camera 100' is positioned on a side close to an edge 402 of smartphone 400. Cutout 404 provided in an enlarged view in FIG. 4B shows the main components of camera 100' (lens 102, prism 104 and sensor 106) and of stepper motor or VCM actuator 116. Prism 104 is positioned behind a protective panoramic transparent screen 406, made, for example, from glass or plastic. In smartphone 400, one usage of camera 100' can be to take 180-degree panoramic pictures, an action illustrated by dotted semicircle arrow 408. In an exemplary use embodiment, camera 100' in smartphone 400 can be used as both "front camera" and "back camera" of the smartphone, where "front camera" and "back camera" have meanings well known in the art.

In some embodiments, a folded camera with panoramic scanning range disclosed herein may be positioned together with a non-folded ("upright") non-scanning camera in a dual-aperture (or "dual-camera") camera arrangement. The non-folded camera may have a FOV smaller than, equal to or larger than the FOV of the folded camera. Dual-aperture cameras including a folded camera and a non-folded camera are described for example in PCT/IB2015/056004. The dual camera may be positioned in a smartphone or in other personal electronic devices. The upright camera may be either a front camera or a back camera of the smartphone.

FIG. 4C shows an isometric back view and FIG. 4D shows an enlarged cutout section of an exemplary embodiment of a smartphone numbered 400' that includes such a dual-aperture camera 450 having an upright camera 412 and a camera 430 with a folded camera with panoramic scanning range 100'. All other components shown are similar to those in FIGS. 4A and 4B. While camera 412 is shown as a back camera of smartphone 400', in other embodiments (as mentioned) it can be a front camera.

Figures 5A, 5B:
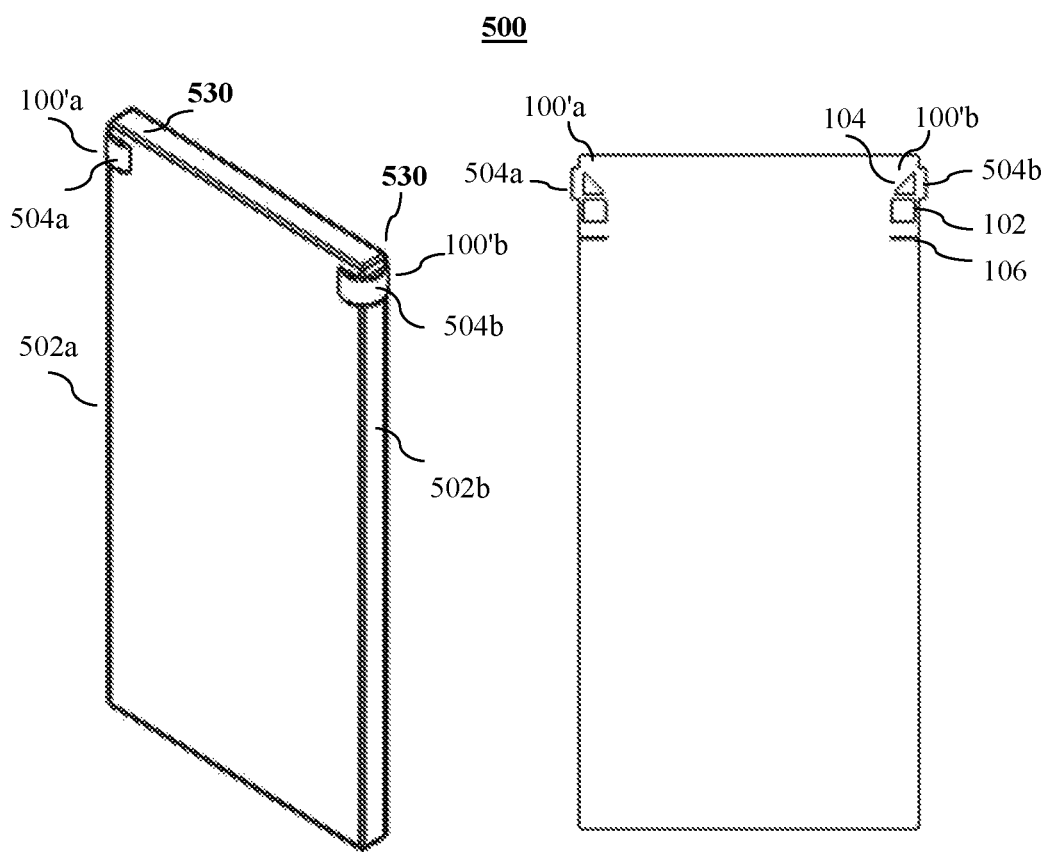
FIG. 5A shows in an isometric view an exemplary embodiment of a smartphone that includes a camera with panoramic scanning range having two folded cameras, according to presently disclosed subject matter.
FIG. 5B shows a back view of the smartphone in FIG. 5A.

FIG. 5A shows in an isometric view and FIG. 5B shows in a back view an exemplary embodiment wherein the platform is a smartphone numbered 500. Smartphone 500 includes a camera 530 with panoramic scanning range comprising two folded cameras like camera 100, as well as associated stepper motors or VCM actuators (not shown). The two cameras, marked 100'a and 100'b are positioned for example on two opposite sides close to respective edges 502a and 502b of smartphone 500. FIG. 5B also shows the main components of each camera (lens 102, prism 104 and sensor 106). The respective stepper motors or VCM actuators are not shown to simplify the figures. Each prism 104 is positioned behind a respective protective panoramic transparent screen 506, made for example glass or plastic. In smartphone 500, one usage of each camera 100'a and 100'b can be to take two respective 180 degree panoramic pictures, which can then be stitched into one 360 degree panoramic picture.

Figure 6A:
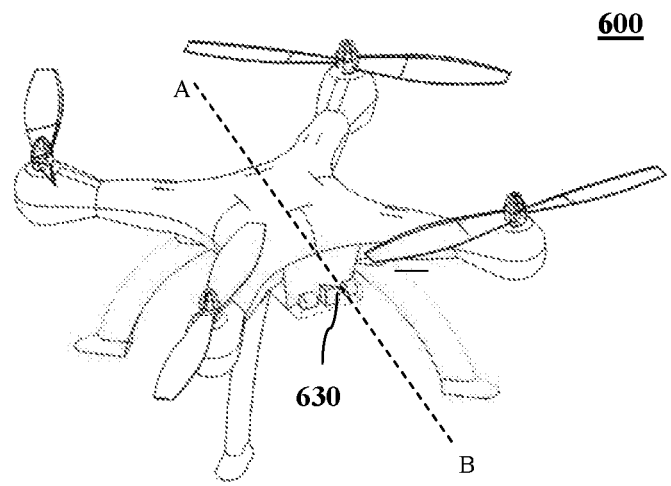
FIG. 6A shows in isometric view from a top side a flying drone that carries a camera with panoramic scanning range comprising a folded camera as in FIG. 1A.
Figure 6B:
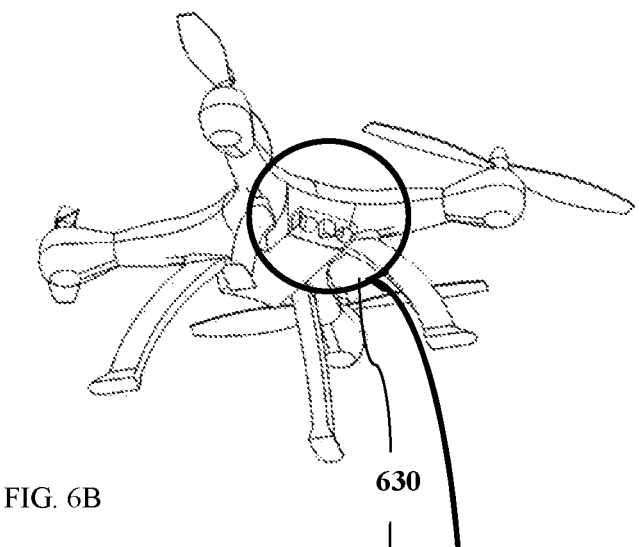
FIG. 6B shows the drone of FIG. 6A in isometric view from a bottom side.
Figure 6C:
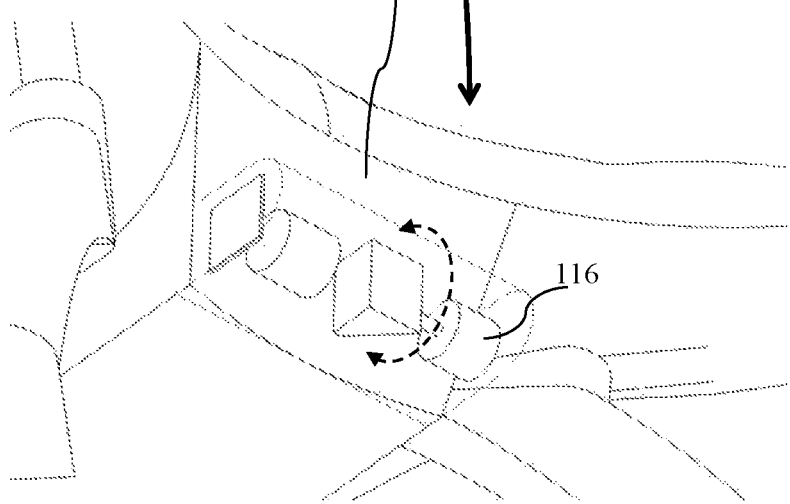
FIG. 6C shows an enlargement of a section marked in FIG. 6B.
Figure 6D:
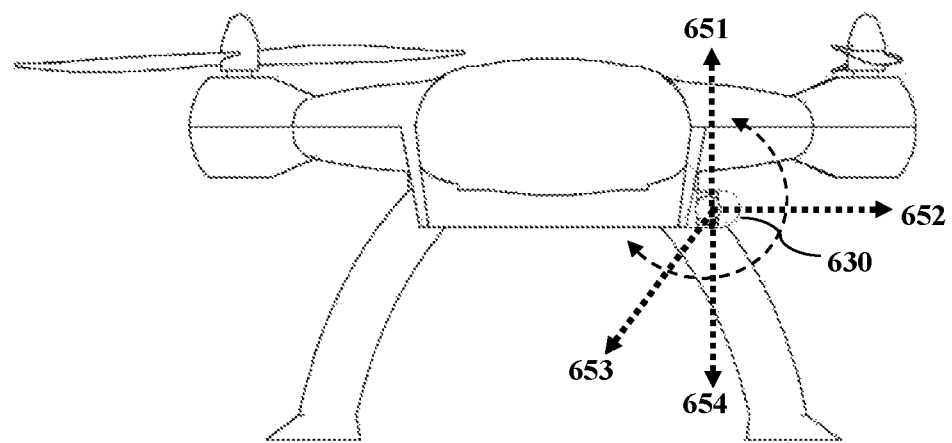
FIG. 6D shows a side view of drone of FIG. 6A along a cut A-B in FIG. 6A.

FIGS. 6A-D illustrate another exemplary platform carrying camera 100. In FIGS. 6A-D, the platform is a flying drone 600 that carries a camera 630 with panoramic scanning range comprising a folded camera 100' like camera 100 and a stepper motor or VCM actuator like actuator 116. Drone 600 is used to fly and take pictures from high above. FIG. 6A shows the drone in isometric view from top, FIG. 6B shows the drone in isometric view from bottom and FIG. 6C is an enlargement of a section marked in FIG. 6B. FIG. 6D, is a cut side view of drone 600 along a cut A-B in FIG. 6A. In system 600, the camera is used to change an angle of photography (marked in FIG. 6D) between: +90 degrees (looking up, 651) to 0 degrees (looking forward, 652) to −90 degrees (looking down, 653) and to −120 degrees (looking down and slightly back, 654), i.e. for a total of 210 degrees. In other examples, the scanning range may change. Camera 100 within drone 600 may autonomously track objects, as described below with reference to FIGS. 8 and 9, as well as in co-owned international patent application PCT/IB2016/057366.

Figure 7A:
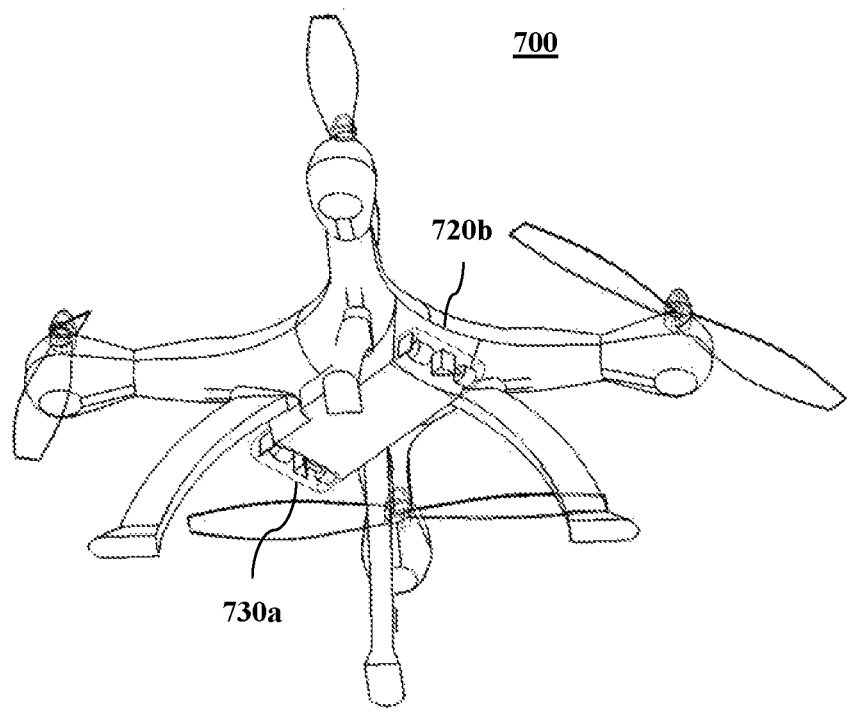
FIG. 7A shows in isometric view from a bottom side a flying drone that carries two cameras with panoramic scanning range, each camera comprising a folded camera as in FIG. 1A.
Figure 7B:
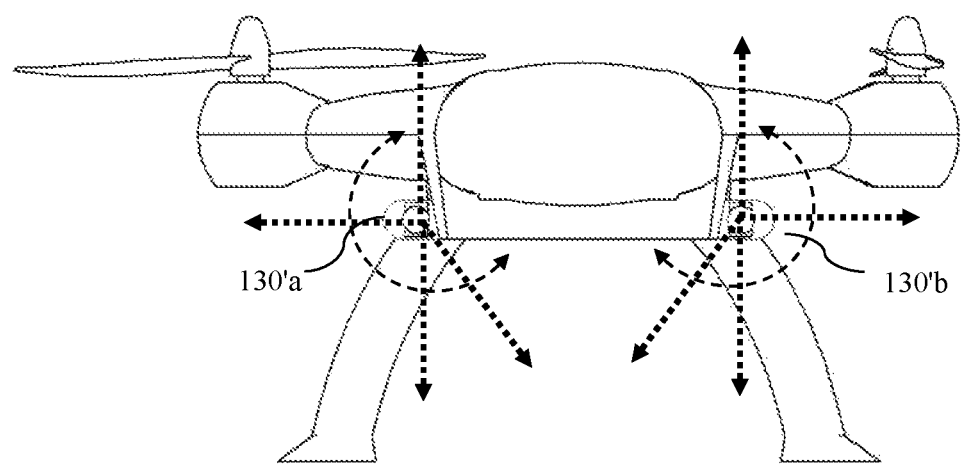
FIG. 7B shows the drone of FIG. 7A from a side view.

FIGS. 7A-B show yet another flying drone 700 that carries two cameras 730a and 730b with panoramic scanning range, each camera comprising a folded camera like camera 100 and a stepper motor or VCM actuator like actuator 116 (not shown). In this configuration the two cameras can take pictures in a scanning range of 360 degrees. The angles of photography indicated by arrows are similar to the ones in FIG. 6D.

Figure 8A:
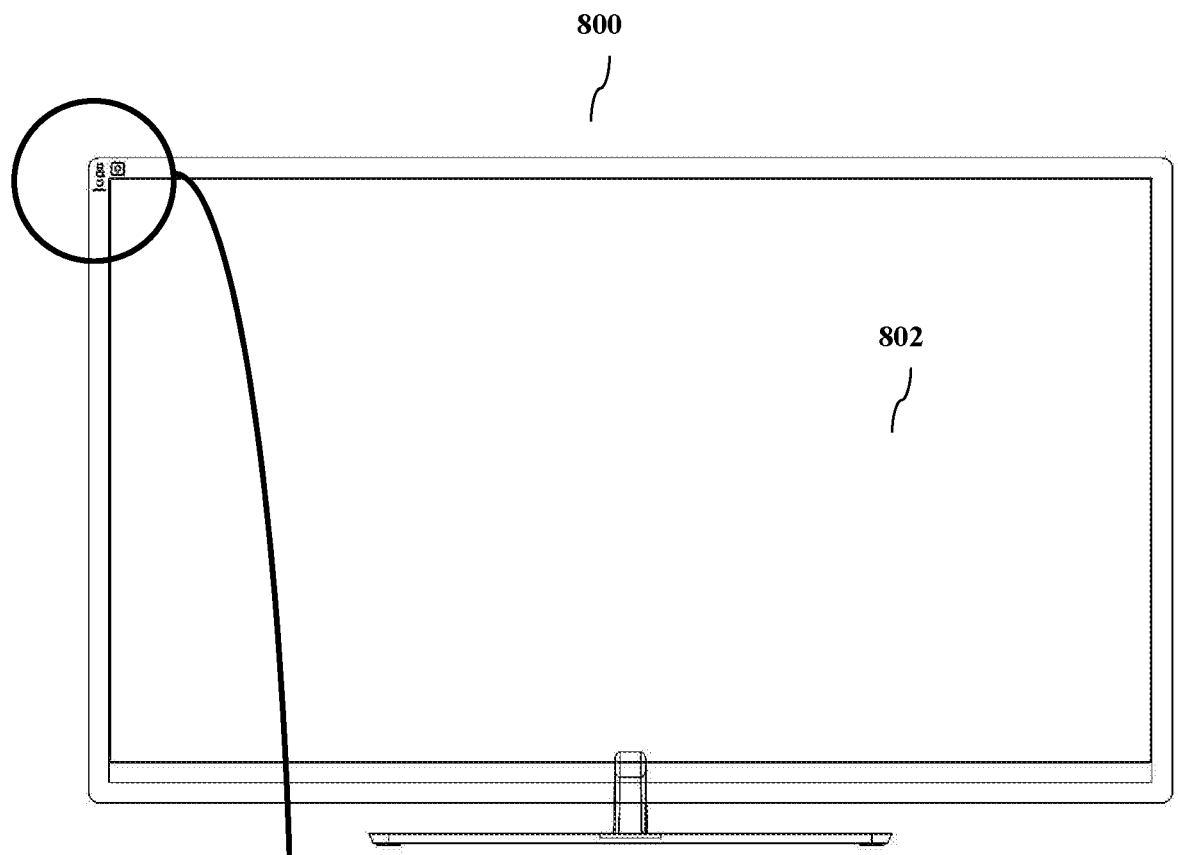
FIG. 8A shows a front view of a TV set that includes a camera with panoramic scanning range comprising a folded camera as in FIG. 1A together with an upright camera, according to presently disclosed subject matter.
Figure 8B:
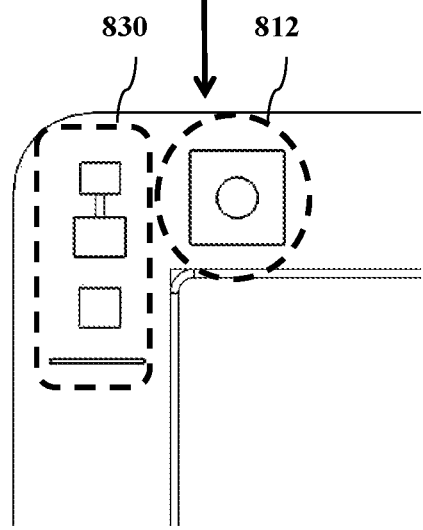
FIG. 8B shows an enlargement of a corner section in the TV set of FIG. 8A in a front view.
Figure 8C:
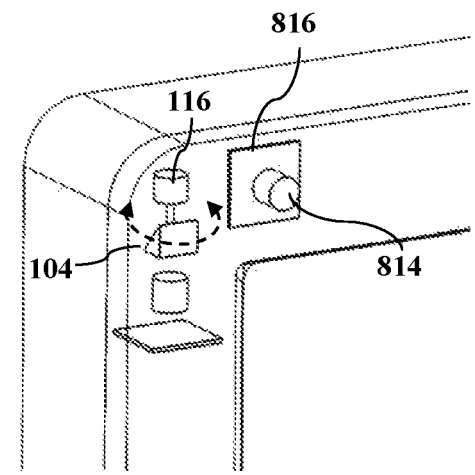
FIG. 8C shows an enlargement of a corner section in the TV set of FIG. 8A in an isometric view.

FIGS. 8A-C illustrate yet another exemplary platform carrying camera 100. In FIGS. 8A-C, the platform is a television (TV) set 800. TV set 800 includes a camera 830 with panoramic scanning range comprising a folded camera like camera 100 and a stepper motor or VCM actuator like actuator 116. TV set 800 further includes an upright camera 812 and a TV screen 802. Upright camera 812 includes a lens 814 and an image sensor 816. TV set 800 may further include one or more speakers and one or more microphones as well as other well-known components (not shown).

FIG. 8A shows TV set 800 in a front view. FIG. 8B shows an enlargement of a corner section in TV set 800 and cameras 812 and 830 in front view. FIG. 8C shows an isometric view of the section shown in FIG. 8B, and the possible rotation of a prism 104 in camera 830. Camera 812 may have a wide (large) FOV, for example 120-180 degrees on the horizontal plane, and is referred to also as Wide camera 812. The FOV of camera 812 is referred to as Wide FOV ($FOV_W$). In TV set 800, camera 830 may have a Tele (narrow) FOV, for example (non-limiting) 30-80 degrees on the horizontal plane. Thus, in TV set 800, camera 830 may be referred to also as "Tele camera" 830, and the FOV of camera 830 may be referred to as Tele FOV ($FOV_T$).

In TV set 800, cameras 812 and 830 are located on a top left corner of TV set 800. In other exemplary embodiments, cameras 812 and 830 may be located in other positions, such as the top center, the left or right side, the bottom side or even beyond screen 802 described below. In another exemplary embodiment, cameras 812 and 830 may be located in a separate module (box) outside of the TV set, connected via cable or via cordless connection.

In an exemplary use embodiment, TV set 800 may be used for video-conferencing as follows: a first user (person) located in a first location may use TV set 800 to communicate with a second user (person) located in a second location. The second user may use any electronic device comprising a screen, for example a TV, a smartphone, a personal computer, a notebook or laptop computer, etc. In an exemplary embodiment, cameras 830 and 812 may be used to video record the first user, while the second user may see recordings from both cameras 830 and 812 on his screen.

TV set 800 may be used for automatic movement or "automatic adjustment" of $FOV_T$ for e.g. tracking a subject in an autonomous manner. A camera mode that performs automatic Tele FOV movement to track an object or subject of interest is referred to herein as autonomous Tele FOV tracking". An exemplary autonomous tracking system and method applicable herein is described in PCT/IB2016/057366 for a smartphone system. The autonomous $FOV_T$ movement is in response to recognition (through e.g. camera 812) of the object or subject of interest, and the Tele image focuses on and displays the object or subject of interest. The object recognition may be performed using any of the methods known in the art.

An example of autonomous $FOV_T$ tracking scenario using TV set 800 is shown in FIGS. 9A-9C. In an exemplary embodiment, camera 812 may take a wide view image of the first location. Camera 830 may then track a first user 902 as he/she moves around and within the $FOV_W$ of camera 812 during the video conference. The second user may see on his screen either (1) the wide FOV, (2) the Tele FOV after tracking, or (3) both the Wide and Tele FOVs. It is assumed that the Tele camera can change its FOV by tilting the prism to track the object of interest. Ideally, the camera will track the object such that it is as close as possible to the center of the adjustable Tele FOV.

FIG. 9A shows the FOVs of Tele camera 830 and Wide camera 812 during autonomous $FOV_T$ tracking, with a first $FOV_T$ position on $FOV_W$. FIG. 9B shows the FOVs of FIG. 9A with a second $FOV_T$ position on $FOV_W$. FIG. 9C shows the FOVs of FIG. 9A with a third $FOV_T$ position on $FOV_W$. In each of these figures, the object of interest is a first user 902.

In the particular example shown, one sees side-by-side views of video streams from both cameras: column (a) shows a screen 900a with $FOV_W$ and $FOV_T$ seen by the first user, while column (b) shows on the right a screen 900b of the second user with $FOV_W$ and $FOV_T$ and on the left a magnified Tele view (image) of part of the face and body of first user 902 and part of the background. In general, the $FOV_T$ in (a) may show the first user (as shown), the second user or another feature from the scene. The $FOV_T$ in (a) showing the first user should therefore not be considered as limiting. In general, the second user (not shown) may see on his screen a video stream from either camera 812 or camera 830, or both cameras 812 and 830 simultaneously (e.g. side-by-side). In case the second user sees only one steam of video, switching between streams may be done using smooth transition techniques, as described for example in co-owned U.S. Pat. No. 9,185,291.

The decision to track the first user may be taken by the first user, the second user (e.g., by remote control usage) or automatically (e.g., using face detection). It is assumed that the Tele camera can change its FOV by rotating the prism to track the object of interest, as disclosed above. Ideally, the camera will track the object such that it is as close as possible to the center of the adjustable $FOV_T$ as seen in the left side of (b) in each figure.

Video streams from cameras 812 and/or camera 830 may be recorded for later usage, which may include additional processing such as image processing, video stream blending, etc.

While this disclosure has been described in terms of certain embodiments and generally associated methods, alterations and permutations of the embodiments and methods will be apparent to those skilled in the art. For example, while a camera and a folded camera with panoramic scanning range are described as exemplarily incorporated in smartphones, flying drones and television sets, such cameras and folded cameras may be also incorporated in other platforms such as vehicles, or incorporated in platforms other than smartphones, for example tablets, laptop computers, phablets, desktop computers, smart speakers, smart watches, electronic book readers, smart glasses, smart helmets, baby monitors, augmented reality systems, virtual reality systems, advanced driving assistance systems (ADAS), etc. The disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present invention.

What is claimed is:

1. A system, comprising:
   a) a first folded digital camera with a first field of view (FOV), the first folded digital camera including a first lens having a first lens optical axis, a first image sensor and a first optical path folding element (OPFE) that folds a first optical path from an object or scene to a second optical path, wherein the second optical path is substantially parallel with the first lens optical axis, and wherein the first OPFE is rotatable around the first lens optical axis relative to the first image sensor; and
   b) a second folded digital camera with a second FOV, wherein the second folded digital camera includes a second lens having a second lens optical axis and a second OPFE that folds the first optical path from the object or scene to the second optical path, wherein the first and second lens optical axes are parallel and wherein the second OPFE is rotatable around the second lens optical axis.

2. The platform of claim 1, wherein the first folded digital camera is operational to change the first FOV autonomously.

3. A method, comprising:
   a) providing a first folded digital camera with a first field of view (FOV), the first folded digital camera including a first lens having a first lens optical axis, a first image sensor and a first optical path folding element (OPFE) that folds a first optical path from an object or scene to a second optical path, wherein the second optical path is substantially parallel with the first lens optical axis, wherein the folded digital camera has a first original orientation and wherein the first OPFE is rotatable around the first lens optical axis relative to the first image sensor;

b) providing a second folded digital camera with a second FOV, wherein the second folded digital camera includes a second lens having a second lens optical axis and a second OPFE that folds the first optical path from the object or scene to the second optical path, wherein the first and second lens optical axes are parallel and wherein the second OPFE is rotatable around the second lens optical axis;

c) rotating the first OPFE around the first lens optical axis relative to the first image sensor in a first rotation direction to set the first optical path in a desired first direction; and d) taking an image.

4. The method of claim 3, wherein the rotating the first OPFE around the first lens optical axis in a first rotation direction to set the first optical path in a desired first direction includes rotating the first OPFE to set the first optical path in a plurality of desired first directions in a first range of up to 180 degrees, and wherein the taking an image includes taking an image at each direction of the plurality of desired first directions, thereby obtaining a matching first plurality of taken images.

5. The method of claim 4, further comprising constructing a first panoramic image from the first plurality of taken images.

6. The method of claim 4, further comprising rotating the first OPFE around the first lens optical axis in a second rotation direction opposite to the first rotation direction, to set the first optical path in a plurality of desired second directions in a second range of up to 180 degrees opposite to the first range, and wherein the taking an image includes taking an image at each direction of the plurality of desired second directions, thereby obtaining a matching second plurality of taken images.

7. The method of claim 6, further comprising constructing a second panoramic image from the first plurality of taken images.

8. The method of claim 7, further comprising combining the first and second panoramic images into a combined panoramic image.

* * * * *